Sept. 7, 1948.　　　　　　W. F. ALLER　　　　　　2,448,652
APPARATUS FOR ARRANGING, GAUGING, AND
ASSORTING ARTICLES ACCORDING TO SIZE
Filed Nov. 10, 1944　　　　　　　　　　　　4 Sheets-Sheet 1
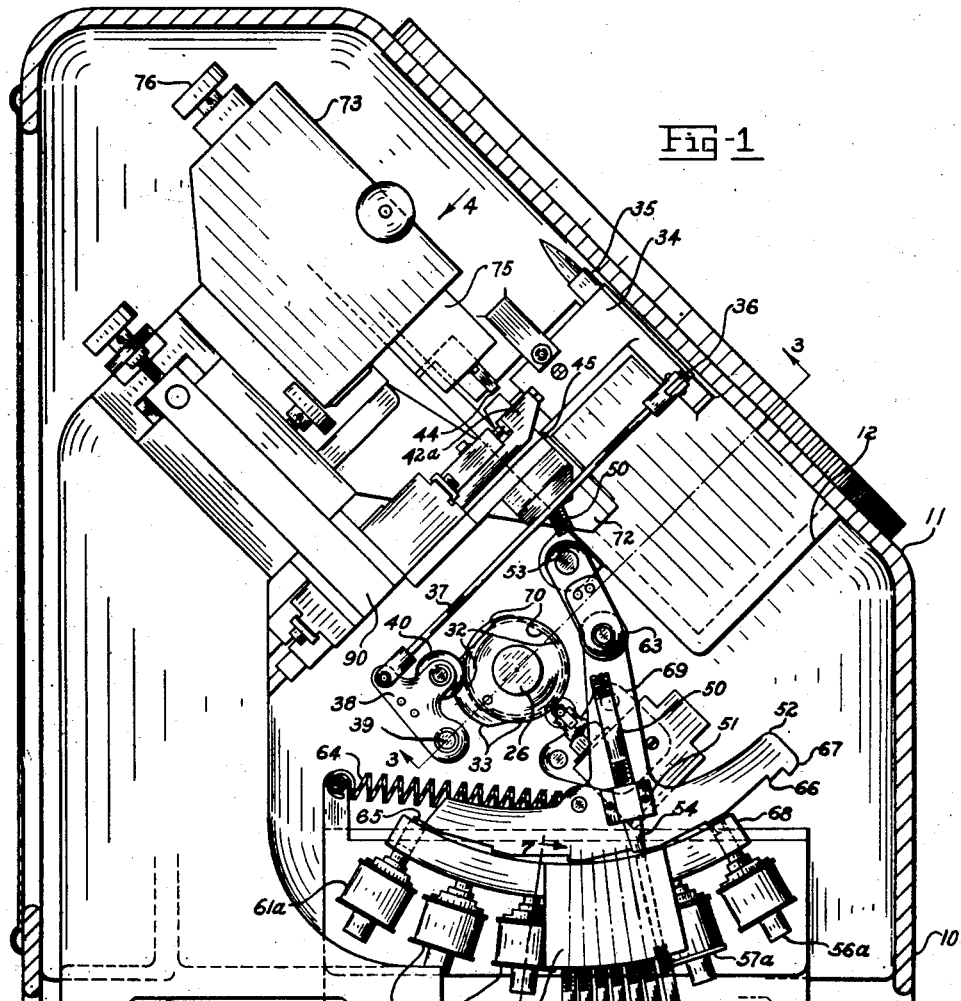
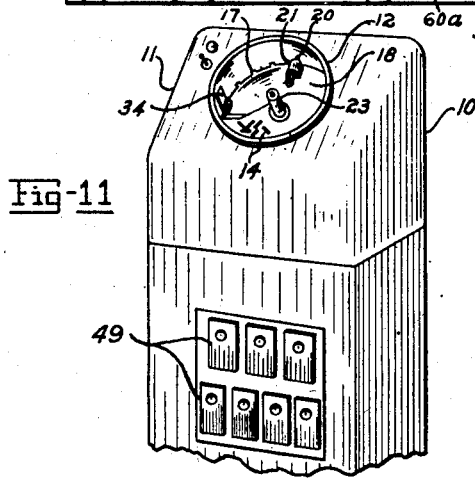

Sept. 7, 1948.   W. F. ALLER   2,448,652
APPARATUS FOR ARRANGING, GAUGING, AND
ASSORTING ARTICLES ACCORDING TO SIZE
Filed Nov. 10, 1944   4 Sheets-Sheet 2

INVENTOR.
W. F. Aller
BY
Edward J. Noé jr
ATTORNEY.

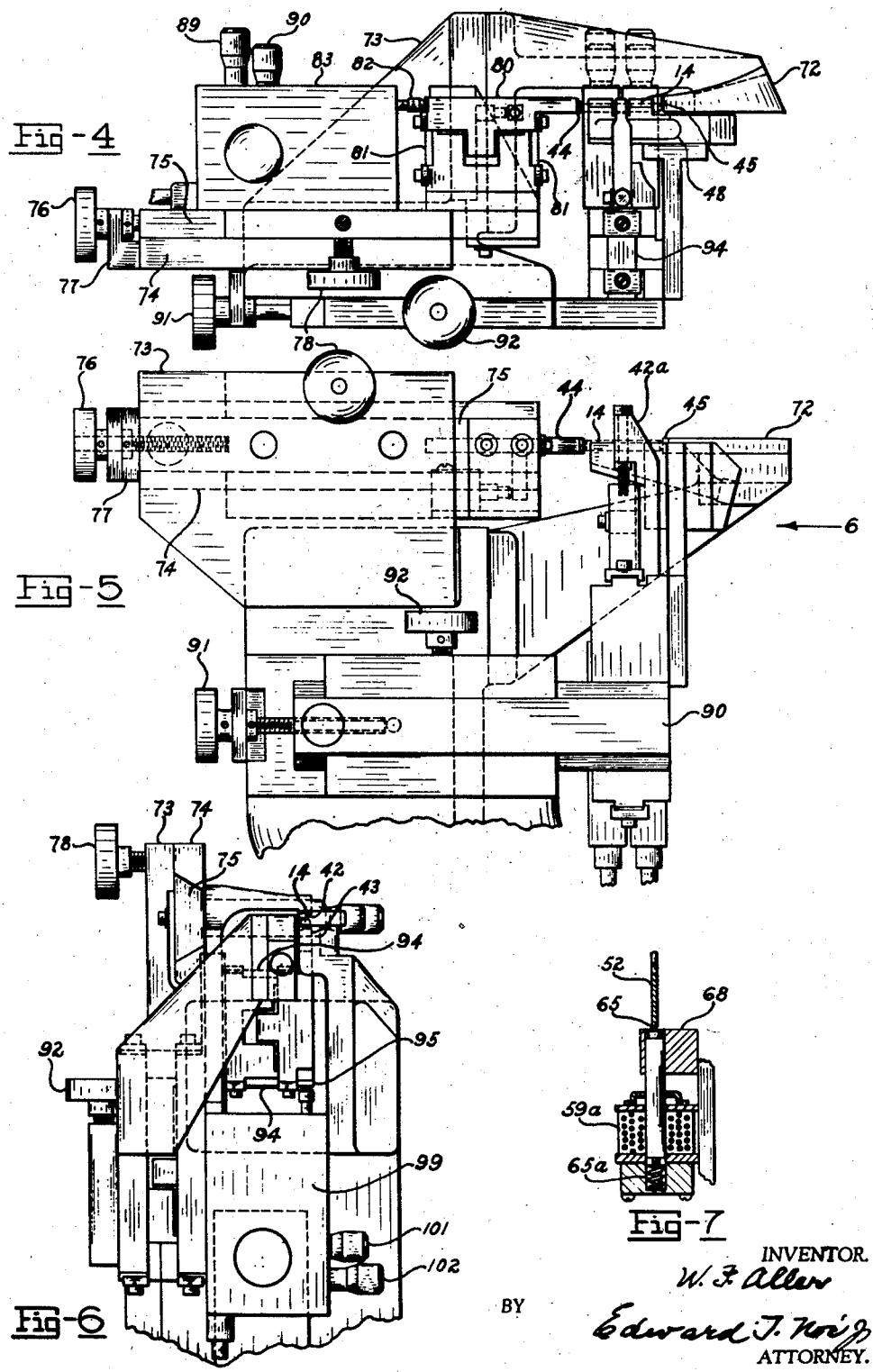

Sept. 7, 1948.    W. F. ALLER    2,448,652
APPARATUS FOR ARRANGING, GAUGING, AND
ASSORTING ARTICLES ACCORDING TO SIZE
Filed Nov. 10, 1944    4 Sheets-Sheet 4
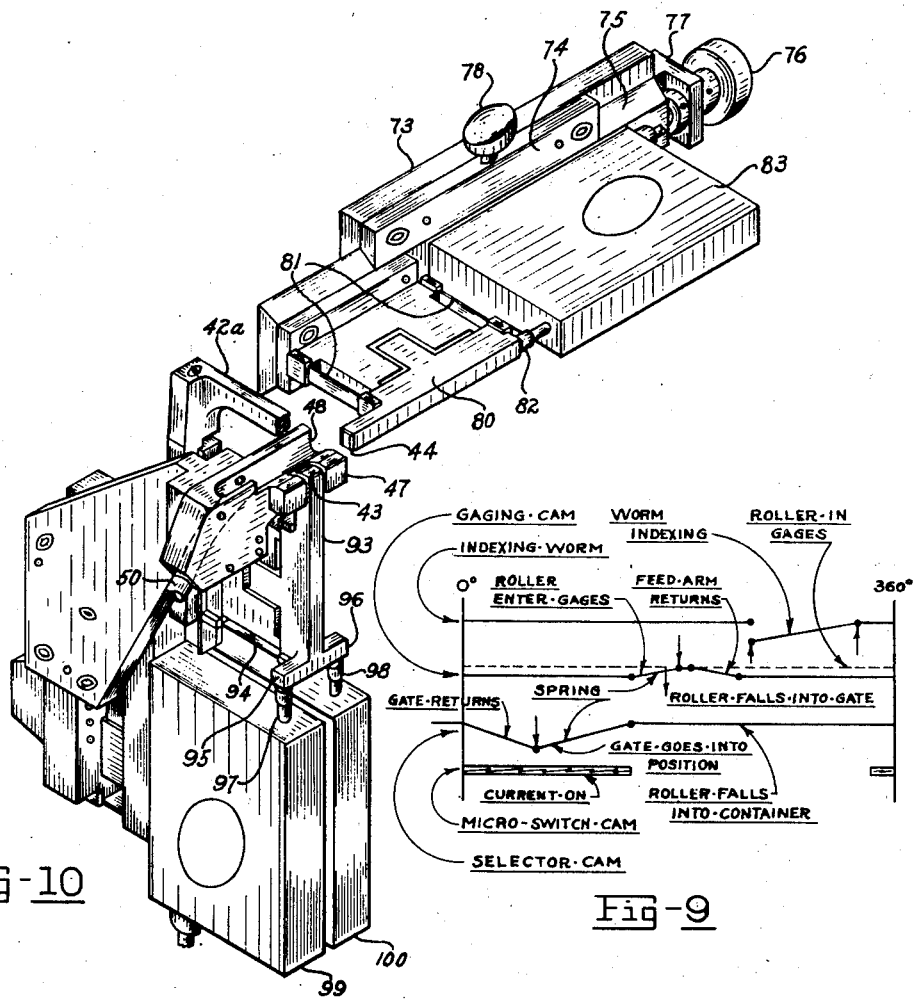
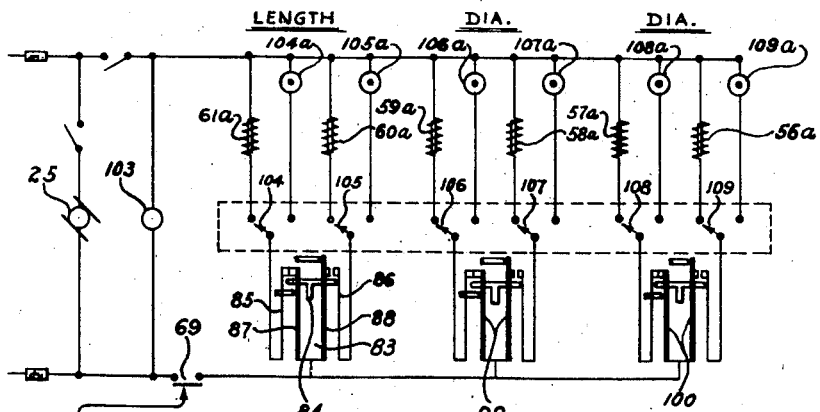
INVENTOR.
W. F. Aller
BY
Edward J. Noi Jr.
ATTORNEY.

Patented Sept. 7, 1948

2,448,652

UNITED STATES PATENT OFFICE 2,448,652

APPARATUS FOR ARRANGING, GAUGING, AND ASSORTING ARTICLES ACCORDING TO SIZE

Willis Fay Aller, Dayton, Ohio, assignor to The Sheffield Corporation, Dayton, Ohio, a corporation of Ohio Application November 10, 1944, Serial No. 562,777

3 Claims. (Cl. 209—88)

1

This invention relates to gauging devices automatically operable to provide for the proper selection of articles in accordance with their size.

One object of the invention is the provision of a gauging device for automatically arranging, gauging and assorting articles according to size and including a movable conduit which is automatically located by switch controlled stops in one of a plurality of selecting positions according to the size of the object, such conduit controlling the movement of articles from a gauging position to a series of article receivers so that the articles will be accurately and rapidly sorted in accordance with their dimensions.

Another object is the provision of a gauging device provided with arranging means whereby a group of articles to be gauged are automatically arranged in an inclined advancing arcuate line of travel, with feeding means for laterally moving the articles out of that advancing line to a gauging station where the articles are gauged, the further movement of the articles being controlled by an automatically operable selector which sorts the articles into different groups in accordance with their sizes.

Other objects and advantages of the invention will be apparent from the following description, the appended claims and the accompanying drawing, in which, Fig. 1 is a side elevation of a gauging device embodying the present invention, with the side wall removed;

Fig. 4 is a plan view looking in the direction of arrow 4 in Fig. 1 and showing the gauging members;

Fig. 5 is a side elevation of the gauging members;

Fig. 6 is a front elevation looking in the direction of the arrow 6 shown in Fig. 5;

Fig. 7 is a section on the line 7—7 of Fig. 1;

Fig. 8 is a diagrammatic view of the electrical connections;

Fig. 9 is a timing diagram;

Fig. 10 is a perspective view of the gauging members as viewed from the front of the gauging device; and Fig. 11 is a perspective view of the gauging device.

Referring more particularly to the drawing, in which the same reference numerals designate

Figure 3:
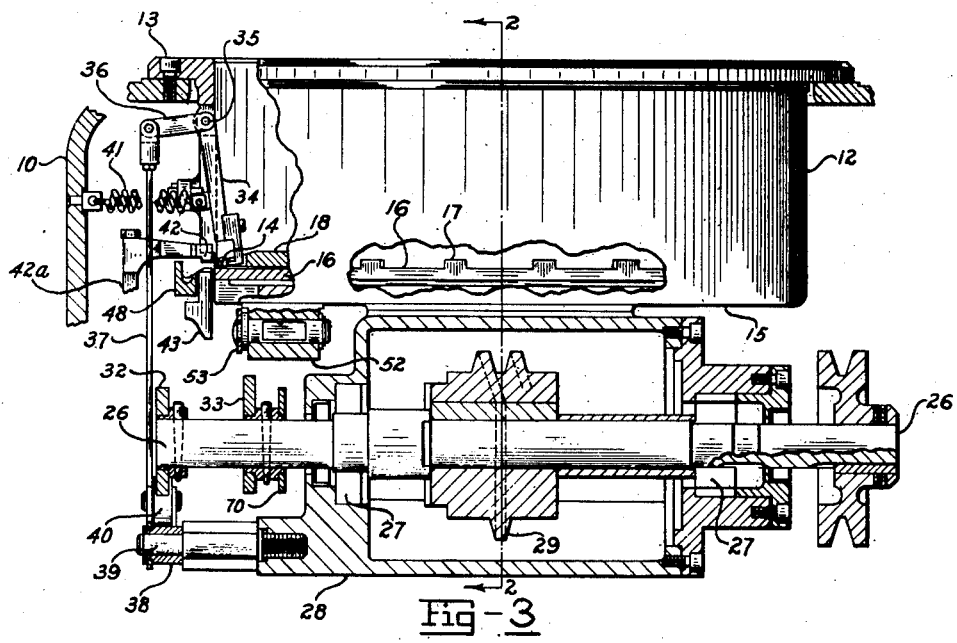
Fig. 3 is a horizontal section on the line 3—3 of Figs. 1 and 2.
Figure 2:
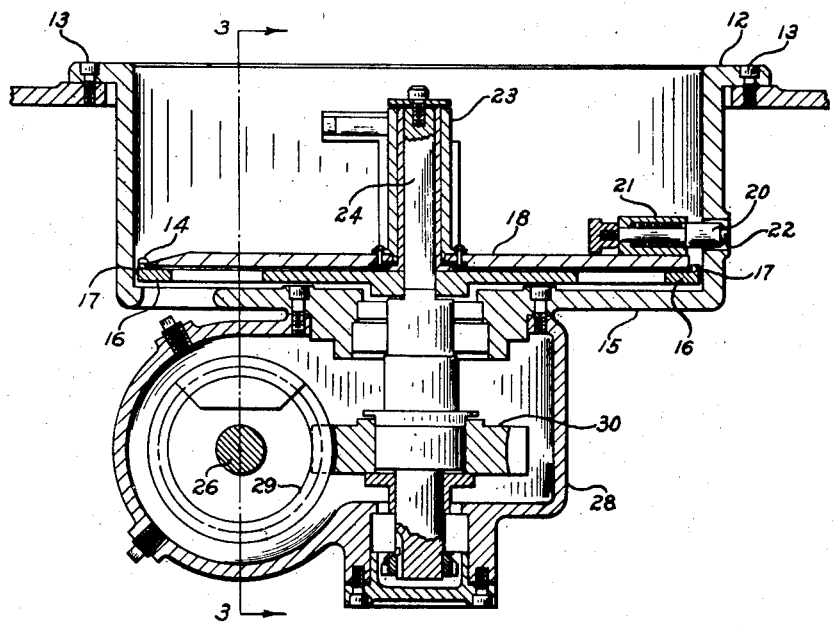
Fig. 2 is a central vertical section through the article arranging hopper and its drive mechanism.

2 like parts in the several views, 10 designates a housing or support in which the various operating elements are contained. It is provided with an upwardly inclined front wall 11 having an opening in which a pan-shaped article receiving hopper 12 is secured. Screws 13 serve to fasten the hopper in place. The front of the hopper is open so that a batch of articles to be gauged, such as rollers or pins 14, can be readily placed in the lower portion of the hopper. These pins for example may be cylindrical anti-friction bearing rollers or the like.

The articles are arranged automatically in the hopper and supplied one after the other to a feeding station located about half way up the side of the hopper, and they are then moved from this feeding station to a gauging station where the length and the diameter of the pins are gauged. This gauging operation serves automatically to control an automatic selector gate or arm which predetermines the path of movement of the articles when they move on from the gauging station. The articles are thus segregated into different groups according to their lengths and diameters.

The arranging of the articles in the hopper is produced as follows. Near the bottom wall 15 of the hopper is a rotatable disc 16 having a series of spaced raised stops or lugs 17 at its periphery. These stops are spaced apart a distance slightly in excess of the length of the pins to be gauged. Overlying the disc is a stationary plate 18 held against rotation by a locking finger 20 which is carried for sliding movements in a lug 21 on the upper portion of plate 18, the end of the finger being received in an opening 22 in the cylindrical wall portion of the hopper. A sleeve 23 fixed to the plate 18 has a bearing engagement with a rotating shaft 24 which thus provides a support and centering means for the plate 18. The plate projects out nearly to the location of the stops 17 so that the space between the stops and between the periphery of the plate 18 and the cylindrical wall portion of the hopper provide chambers or spaces each of which can receive only one of the pins or objects to be gauged and these pins are picked up one by one as the disc is rotated and carried upwardly until they reach the feeding station about half way between the top and bottom of the hopper.

The disc 16 is automatically moved step by step through a motor driven shaft 26 which is continuously driven at a suitable speed by a motor 25 in the base portion of the gauging device. The motor is diagrammatically shown in Fig. 8. The shaft 26 is supported by bearings 27 in a housing 28 which is fixed to the bottom wall 15 of the hopper. Fixed on this shaft is a worm 29 having a single tooth or thread, engaging a worm wheel 30, the single thread on the worm being such that during each revolution of the shaft 26 the worm wheel 30 will be advanced one tooth length and then stop for a part of a revolution until this action is again repeated. The teeth on the worm wheel 30 are such that the disc 16 will be advanced through a travel corresponding to the distance between the centers of adjacent stops 17 so that the pins picked up by these stops will be advanced, one by one, to the feeding station and pause at that station. The shaft 26 is also provided with a cam 32 which actuates the feeding means, and a cam 33 which actuates the selector arm through which the path of movement of the articles from the gauging station is controlled.

The article is moved from the feeding station through a hole in the cylindrical wall portion of the hopper by a feed arm 34 pivotally carried at 35 on the hopper wall and fixed to an arm 36 which is pivotally connected to a link 37. The other end of this link is pivotally connected to a rock arm 38 pivotally supported at 39 and having a roller 40 which engages the cam 32. The movements of the arm 38, being timed with the step by step advance of the disc 16, are such that the feed arm 34 moves an article out of the hopper and is then moved back to its normal position before the hopper disc travels forward again. While the cam 32 controls the timing of the feeding arm, the actual moving force applied to the arm to advance the articles into gauging position is produced by a spring 41 fixed to a portion of the housing 10 and secured to the arm 34 as shown in Fig. 3. The movements of the arm 34 carry the workpiece to a position in which it is straddled by gauging fingers 42 and 43 which gauge the diameter (see Fig. 3), and between gauging fingers 44 and 45 which gauge the length of the article. In its gauging position the article rests on a stationary support 47 (see Fig. 10), and is held there by the slight pressure applied to it through the gauging fingers mentioned. When the next article is advanced from the feeding station to gauging position by the feed arm 34, the piece that had been previously moved to gauging position is pushed off laterally by this following article, and the piece that is pushed off rolls down into an inclined trough 48. The article in its gauging position is inclined at an angle of about 45°, and the trough is correspondingly inclined so that the article can immediately slide down the trough which leads down to the upper end of a flexible conduit 50.

The lower portion of the flexible conduit is secured by a clamp block 51 (see Fig. 1), to a selector arm or gate 52 pivotally supported at 53 so that it can oscillate back and forth and arrange the terminal end 54 of the conduit in line with a series of passages or pipes 55, 56, 57, 58, 59, 60 and 61. The upper ends of these passages are provided in a stationary block 62 and the lower portions are formed by flexible conduits or pipes leading from that block to different collection boxes 49 from which the segregated workpiece can be readily removed.

The arm 52 is provided with a roller 63 operated by the cam 33, spring 64 normally holding the arm towards the left as viewed in Fig. 1. When the lobe of the cam 33 engages the roller 63, it swings the arm towards the right, and continued movement of the shaft 26 then permits the arm to swing back under the action of the spring 64 until the arm is stopped by selectively operable stop pins 65 on the ends of the solenoid cores of solenoids 61a, 60a, 59a, 58a (which is hidden back of the block 62), 57a and 56a. These stop pins, when the solenoids are deenergized, are projected up by springs 65a (see Fig. 7) into the path of teeth 66 on the lower side of the arm 52 and serve to stop the return movement of the arm to arrange the terminal end 54 of the conduit 50 adjacent the selected passage 55 to 61 according to which solenoids are energized. If none of these solenoids is deenergized the arm 52, in its return movement, swings back until a terminal stop 67 on the arm engages the end of the segmental plate 68 in which the several stop pins are slidably arranged, and this locates the terminal end 54 opposite the passage 55. The spacing between adjacent teeth 66 exceeds the distance between adjacent solenoid stops by an amount equal to the spacing of the tubes 55 to 61.

A microswitch 69 is located on a wall of the housing 10. It is operated by a cam 70 fixed on the shaft 26 and controls the closing and opening of a circuit at the proper time in the sequence of operations, as will be presently described.

The length of the article when in its gauging position is gauged by the gauging fingers 44 and 45, the latter being provided on a stationary arm 72 at the upper end of a stationary standard 73. This standard carries guides 74 which slidably support a slide 75. This slide can be adjusted along the guides 74 by turning an adjusting screw 76 threaded in a bracket 77 on the standard 73 and threaded in the end of the slide 75. A set screw 78 can lock the slide in its adjusted position, the slide position being dependent upon the length of the object to be gauged. The slide 75 carries a bar 80 by means of a pair of parallel flat spring blades 81. One end of each of these blades is secured to the slide while the other end is secured to the bar 80 to mount the bar for yielding rectilinear movement towards and from the work position. The gauging finger 44 is on the end of this bar. The other end of the bar engages a spring pressed gauging plunger 82 of a gauging device or switch 83 fixed on the slide 75. The gauge 83 may correspond to the construction disclosed in the prior application of W. F. Aller, Serial No. 484,529, filed April 26, 1943, now Patent No. 2,384,519, dated September 11, 1945, or to the construction of Patent No. 2,254,313, so that the gauging plunger 82 controls a switch operating arm 84 (see Fig. 8).

In its normal position the arm 84 is out of contact with two spring contact blades 85 and 86 permitting these blades to close circuits through stationary contact blades 87 and 88 respectively. The position of these stationary blades can be controlled by adjustment knobs 89 and 90 shown in Fig. 4 to preset the gauge for a predetermined permissible tolerance before either one or the other contacts will be broken by the arm 84 as the arm is deflected to one side or the other from a centered position, by operation of the gauging plunger 82. In the position of this switch 83 shown in Fig. 8, a circuit is completed through the solenoid 61a so that the stop pin 65 that it controls will be pulled down out of the path of the teeth on the arm 52. On the contrary, there is no circuit through the solenoid 60a, since the flexible switch blade 86 has been moved away from the stationary blade 88, and the stop pin 65 of that solenoid will therefore be projected and stop the selecting movement of the selector arm unless some other stop pin of another solenoid has previously stopped this selecting movement. If the length of the pin exceeds a predetermined limit, the solenoid 61a will not be energized, as the switch controlling arm 84 will be moved far enough to the left from the position shown in Fig. 8 to open the circuit between the blades 85 and 87, this condition corresponding to the position of the parts shown in Fig. 1, where the stop pin 65 of solenoid 61a is projected, stopping the arm 52 so that the terminal 54 of the flexible conduit is in line with the passage 61 through which oversize workpieces are conducted to the receptacle for pieces that are too long. Pieces that are too short will locate the switch controlling arm 84 in the position that is shown in Fig. 8, opening the circuit through solenoid 60a which will stop the return swing of the selector arm so that the conduit 50 is in line with the passage 60 through which the workpieces that are too short in length are conducted to their proper receptacle. If the arm 84 is substantially centered and both of these solenoids 61a and 60a energized, the selector arm in its return will move past both of the passages 61 and 60 to bring the conduit terminal 54 into alignment with one of the remaining passages which select the workpieces in accordance with their diameters.

The diameter of the article, while in its gauging position, is determined by the gauging fingers 42 and 43. The upper finger 42 is on a bar 42a carried by a slide 90 which can be adjusted in the standard 73 by a thumb screw 91 and held in position by locking screw 92 (see Fig. 5). This permits the whole slide 90 to be so positioned as to measure the articles at a point midway between its ends. This slide 90 also carries the trough 48 as shown in Fig. 10. The other gauging finger 43 is on the end of a bar 93 which is carried by flexible spring blades 94 fixed to the bar and to the slide 90. At the lower end of the bar 93 there are two ledges 95 and 96 controlling two gauging plungers 97 and 98 of gauge switches 99 and 100 respectively which are fixed on the slide 90. Both of these gauging plungers 97 and 98 will be similarly operated in accordance with the diameter of the workpiece. The gauge switch 99 is so set by the adjustment knobs 101 and 102 which locate its stationary contact blades as to reject workpieces that are either of too large or too small diameter while pieces that are within a predetermined tolerance range of acceptable sizes will permit both sets of contacts of this gauge switch to close, keeping both of the solenoids 59a and 58a closed so that these solenoids will not interfere with the return swing of the selector arm. The gauging switch 100 has its stationary switch blades so set as to close the circuits through both the solenoids 57a and 56a if the workpiece diameter conforms to a range of sizes well within the tolerance limits. Workpieces slightly larger than this, but still within the tolerance limits as controlled by the gauge switch 99 will cause the solenoid 57a to be open circuited so that the return movement of the selector arm 52 will arrange the terminal ends of the flexible conduit in line with the tube 57. Pieces that are slightly smaller than the middle range of satisfactory size, but not too small to reject, will cause the solenoid 56a to be open circuited so that the stop pin 65 of that solenoid will stop the return swing of the selector arm to permit passage of the workpiece through the tube 56. If the length is right and the diameter falls within the middle range of satisfactory diameters well within the tolerance limits, all of the switches will be closed and none of the solenoids energized so that the return swing of the selector arm carries through to completion and is only stopped by the terminal stop 67 which arranges the conduit in line with the passage 55. While the arrangement herein disclosed divides the workpieces into seven different groups, it will be obvious that additional gauging switches could be employed for further division of either lengths or diameters, and if only one diameter check is required the gauging switch 100 is unnecessary.

The wiring diagram includes an indicator lamp 103 which is energized when the device is operating and setup switches 104, 105, 106, 107, 108 and 109, one for each of the solenoids which can be manually operated to change the connections from the gauge switches to indicator circuits including lamps 104a, 105a, 106a, 107a, 108a and 109a for viewing conditions when the device is being originally set up or adjusted for any particular article size.

The timing of the sequence of operations is diagrammatically shown in Fig. 9. The gauging cam is the cam 32 which moves the article into gauging position and then returns back to its normal position along the line "feed arm returns." After it has returned the work indexing movement takes place to bring the next article into position opposite the gauging location and ready to be fed into gauging position. After the article is moved into gauging position the microswitch 69 is closed by cam 70, and current is supplied to the several gauging switches as will be apparent from Fig. 8, and the switches control the energization of the solenoids as previously mentioned. At about this same time the selector gate return movement takes place, that is the swinging movement of the selector arm 52 towards the right, this movement being of course permitted even if one or more of the selenoids are deenergized and the springs in back of the solenoid plungers project these plungers. While the workpiece is still in gauging position, the spring 64 pulls the selector gate back towards the left and the extent of its swing will be governed by the several solenoids, whichever one or ones are deenergized. After the selector arm is properly positioned by a projected stop pin 65 of a deenergized solenoid, the stop pin will be held projected by pressure applied to it through the arm 52 because the stop pin has a frustro-conical shape as shown in Fig. 7, so that the selector arm will remain positioned while the next article is being supplied to gauging position and pushes the article just gauged off into the trough 48 along which it immediately slides and then travels through the flexible conduit 50 into the selected tube and thus into the proper receptacle.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging device comprising a holder for articles to be gauged, means for arranging the articles to be gauged in an advancing line, feeding means for periodically moving an article from the advancing line to a gauging station, gauging means at the gauging station, a series of electric switches operated by said gauging means for gauging different dimensions of the articles, a series of article receivers, a pivoted selector arm having a conduit for carrying the articles from the gauging station to a selected receiver, cam means for swinging said arm to carry the end of said conduit along the series of article receivers, and a series of solenoid operated stops controlled by said switches for arresting the swinging movements of said arm, and power means for driving said cam means, said arranging means and said feeding means in timed relation.

2. In a gauging device having a gauging station and gauging means at the gauging station for gauging the size of articles supplied thereto, an inclined rotatable disc having spaced stops along its periphery, a substantially circular stationary wall arranged about said disc, said wall having an opening at one side thereof adjacent an upwardly moving side of said disc, said disc and wall providing a holder for a batch of articles to be gauged and for automatically arranging the articles in an inclined arcuate line of advance, and a movable feeding arm operable to push articles radially of said disc through said opening to a gauging station.

3. In a gauging device having a gauging station and gauging means at the gauging station for gauging the size of articles supplied thereto, an inclined rotatable disc having spaced stops along its periphery, a substantially circular stationary wall arranged about said disc, said wall having an opening at one side thereof adjacent an upwardly moving side of said disc, said disc and wall providing a holder for a batch of articles to be gauged and for automatically arranging the articles in an inclined arcuate line of advance, and a movable feeding arm pivoted on said wall adjacent said opening and operable to push articles radially of said disc out of said advancing line, means for intermittently rotating said disc and for operating said arm in timed relation to the motion of said disc.

WILLIS FAY ALLER.

REFERENCES CITED

The following references are of record in the file of this patent:

UNITED STATES PATENTS

| Number | Name | Date |
|---|---|---|
| 439,932 | Curtis | Nov. 4, 1890 |
| 685,608 | Hollerith | Oct. 29, 1901 |
| 1,156,337 | Wood | Oct. 12, 1915 |
| 1,558,079 | Duston | Oct. 20, 1925 |
| 1,578,458 | Miller | Mar. 30, 1926 |
| 1,694,408 | Cogswell | Dec. 11, 1928 |
| 1,706,632 | Onstad | Mar. 26, 1929 |
| 1,894,025 | Dennsion | Jan. 10, 1933 |
| 2,254,313 | Poock et al. | Sept. 2, 1941 |
| 2,368,796 | Ardell | Feb. 6, 1945 |
| 2,392,856 | Martinec | Jan. 15, 1946 |

FOREIGN PATENTS

| Number | Country | Date |
|---|---|---|
| 577,658 | Germany | June 2, 1933 |